Patented Nov. 24, 1953

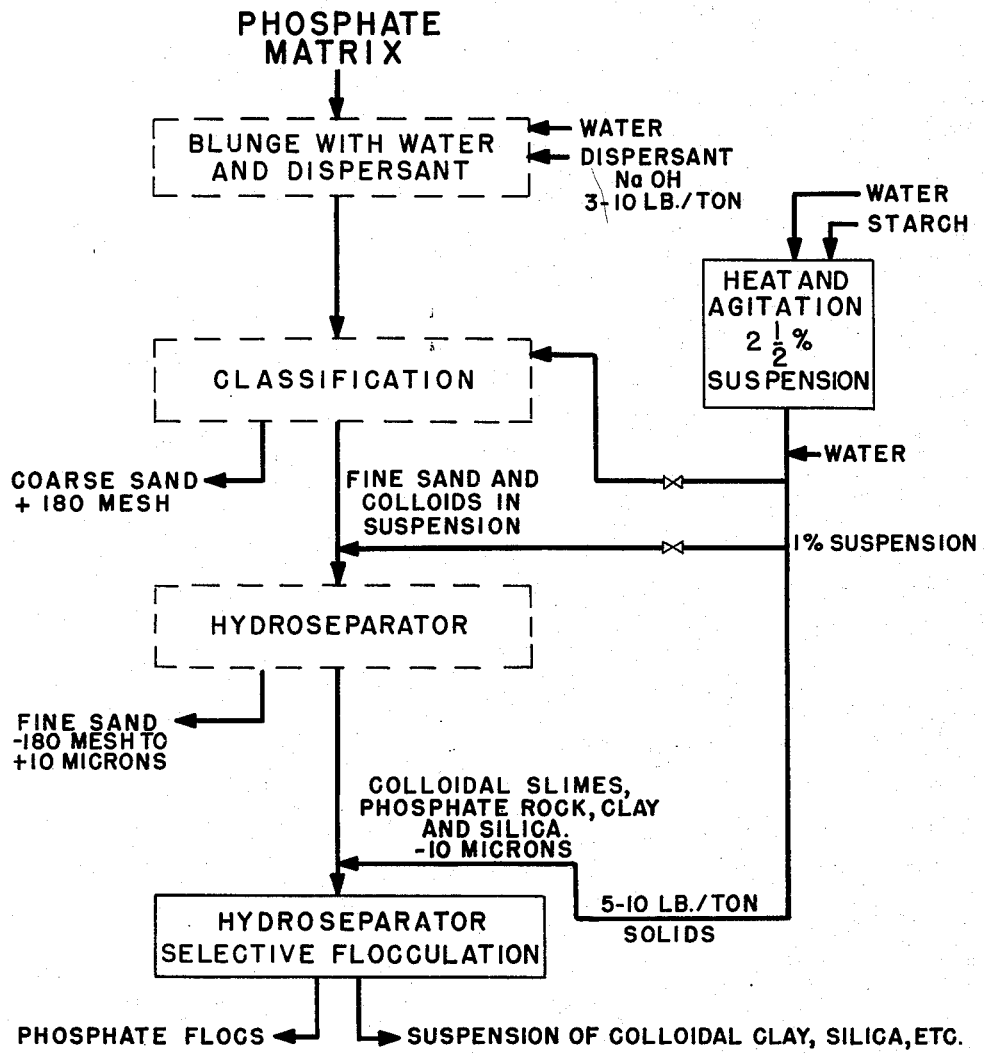

2,660,303

UNITED STATES PATENT OFFICE 2,660,303

SELECTIVE FLOCCULATION OF COLLOIDAL PHOSPHATE ORE IN THE PRESENCE OF CLAY

Joseph F. Haseman, Florence, Ala., assignor to Tennessee Valley Authority, a corporation of the United States of America Application September 10, 1951, Serial No. 245,959

1 Claim. (Cl. 209—5)

(Granted under Title 35, U. S. Code (1952), sec. 266)

The invention herein described may be manufactured and used by or for the Government for governmental purposes without payment to me of any royalty thereon.

This invention relates to the concentration of phosphate minerals and is specifically concerned with methods for improving the phosphate recovery in a washing plant for phosphate ore.

In one of the common methods for the recovery of phosphate ore, the ore with accompanying matrix is mined with shovels or scoops and mixed with water to form a pulp. The pulp is then passed through several mills of the ball, pug, or hammer type to disintegrate the lumps, which are composed of phosphate sand mixed with clay, silica, and other impurities. The pulp from these mills is pumped through a series of classifying units in which phosphate-sand fractions of successively smaller particle size are separated from the pulp in the successive units. Thus the larger phosphate particles are removed until the pulp contains only particles of less than about 180 mesh in size. Since these particles settle relatively slowly, the pulp is next pumped to a hydroseparator where the retention time is sufficiently high that plus 10-micron phosphate sand settles and is recovered, while the minus 10-micron phosphate overflows along with the clay and other gangue and is discarded.

The phosphate sand lost in the hydroseparator overflow represents a considerable portion of that present in the original ore, so that increasing the recovery of this very fine phosphate is an important problem in the phosphate industry. The difficulty of separating clay and phosphate at this point is increased by the fact that the phosphate particle size is in the colloid range, which prevents it from settling at a rate high enough to make ordinary settling methods feasible. Also, beneficiation methods such as flotation, tabling, etc., are not feasible because, in the first place, the pulp is too dilute at this point to allow the use of such methods and, in the second place, the particle size of the clay and phosphate is so small that such methods would not be applicable even if the pulp were of a suitable concentration. As a result, no ordinary ore-dressing methods have been found capable of economically separating any part of the phosphate from such pulps. It is possible, of course, to build a hydroseparator large enough to give a retention time that would allow separation of phosphate and clay at considerably less than 10 microns. Cost of equipment of the required size, however, would be prohibitive.

An example of a process that is operable with particle sizes above the colloid range but is not applicable to pulps containing minus 10-micron solids is that proposed by Phelps (U. S. Patent 2,381,514). In this process, reagents that have the property of accelerating the settling of all the various types of solids in the pulp are added to pulps in which the phosphate particle size is about minus 65 mesh. A considerable portion of the total solids is recovered thereby in concentrated form and can then be subjected to flotation or other methods to recover the phosphate from the gangue. This method cannot be used on minus 10-micron pulps, however, because even if the fine solids could be settled and recovered they would still be too fine for treatment by flotation or other common methods. Solids as fine as this correspond, in effect, to the "slimes" which ordinarily must be removed from ores and ore pulps before flotation can be carried out. The minus 10-micron size corresponds roughly to minus 1500 mesh as compared to Phelps' minus 65 mesh.

Another method applicable only to pulps containing solids of relatively large particle size is that of Chapman and Littleford (U. S. Patent 1,968,008), in which a selective agglomerating agent such as petroleum oil is added to a thick pulp of phosphate ore. The pulp is then subjected to agitation under wet stratifying conditions, the resulting loose agglomerates of phosphate rising to the surface and the unagglomerated gangue settling to the bottom. This method is not applicable to pulps containing very fine phosphate, because reagents that have an agglomerating effect on relatively large particles do not have such an effect on particles of colloidal dimensions. The petroleum oil used by Chapman and Littleford as a selective flocculant accomplishes its effect by coating the phosphate particles and causing a simple sticking together to form agglomerates; with colloidal particles, however, electrical charges on the particles must be overcome before agglomeration will take place, and petroleum oil and other known selective flocculants are not suitable for this purpose at all.

It is also known that common flocculating agents such as acids, lime, salts of calcium, barium, magnesium, aluminum, iron, and organic bases, when added to a colloidal phosphate rock-gangue suspension, result in the formation of a gel rather than separate flocs. Gel formation is particularly marked when, as is usually the case, the gangue contains a high proportion of clay.

So far as I know, there has been no effective method suggested for separating colloidal phosphate-rock particles from colloidal clay and other colloidal matrix impurities. It has been customary in the industry to pass such suspensions to waste, although it is known that they contain a substantial proportion of the phosphate ore originally mined.

It is an object of this invention to provide a process for the recovery of phosphate ore from colloidal slimes produced in processes for washing phosphate rock from matrix.

Another object is to provide a process for separating colloidal phosphate-rock particles from colloidal clay, silica, and other matrix impurities.

Another object is to provide a process for the selective flocculation of colloidal phosphate-rock particles in an aqueous suspension containing large quantities of colloidal clay and other matrix impurities.

Another object is to provide such process which is cheap and convenient in operation and which may be carried out without large equipment costs.

Still another object is to provide a particularly effective reagent for selectively flocculating colloidal phosphate-rock particles in the presence of clay and other colloidal matrix impurities.

Other objects and advantages will become apparent as this disclosure proceeds.

I have found that these objects may be attained by adding an effective quantity of colloidal dispersion of starch to an aqueous suspension of colloidal particles of phosphate rock and clay, such as the tailing suspensions produced in the washing of phosphate ore from matrix. The starch causes flocculation of the colloidal particles of phosphate rock without affecting colloidal impurities. The flocs of phosphate rock then settle rapidly and may be recovered in a hydroseparator or by other means for separation.

The attached drawing is a flowsheet illustrating diagrammatically a process embodying principles of my invention. Steps that are in themselves old in the art are indicated therein by broken lines. This flowsheet illustrates phosphate rock and matrix, as mined, being passed to a dissociation zone where the ore is blunged with water and a dispersant. It is necessary to add a dispersing agent to obtain proper disintegration of lumps. A high degree of dispersion is also essential to obtain subsequent differential flocculation of the phosphate-rock particles. Usually from 3 to 10 pounds of sodium hydroxide is used per ton of solids in the pulp, but other common dispersants such as pyrophosphates, sodium silicate, sodium oxalate, etc., may be used without interfering with subsequent selective flocculation of colloidal phosphate-rock particles by the method described herein.

After blunging, the resulting mixture in the form of a thin pulp is passed to a classification system where particles of successively smaller size are removed. As commonly practiced, the pulp passes successively through a rake-type classifier, a bowl-type classifier, and a centrifugal classifier of the "Bird" type. These are usually operated to remove substantially all particles larger than about 180 mesh in size. After removal of such material, the resulting suspension of fine sand and colloids is passed to a hydroseparator as the last unit in the classification system. Economic considerations usually limit such hydroseparators to recovery of particles greater than 10 microns in average diameter. For this reason the terms "colloid" and "colloidal" are used in this specification to include all particles of less than 10 microns average diameter.

The overflow from the hydroseparator, containing colloidal slimes of phosphate rock, clay, silica, and other matrix solids, is passed to a second hydroseparator and is intimately mixed with an effective quantity of starch dispersion. The starch dispersion is preferably introduced as a suspension of about 1 per cent concentration. The effect of the starch is to selectively flocculate colloidal particles of phosphate rock without affecting gangue solids. The phosphate flocs are then separated from the suspension of gangue solids and the latter is passed to waste.

In most installations it is preferable to introduce the starch suspension at an earlier point in the classification system to avoid difficulties in securing proper mixing. For instance, it may be introduced into the feed suspension just prior to the first hydroseparator. Thus the flocculated phosphate particles are recovered in the underflow from the first hydroseparator together with fine sand and a second hydroseparator is not needed.

In some installations it may be convenient to add the starch at some point still earlier in the classification system. When this is done, however, care should be taken to select a point so that the suspension subsequently will not be subjected to too violent agitation, since this has a tendency to break up the phosphate flocs formed.

Any of the common starches may be used. Corn, potato, and arrowroot starches all have been used successively. I prefer to prepare the starch dispersion by heating a suspension of about 2½ per cent starch in water to boiling, agitating it vigorously to disperse the starch micelles, and finally diluting to about 1 per cent. I have found that such dispersions of starch prepared by heat and agitation give better selective flocculation than starch dispersed with the aid of acids or bases. This is opposite to the effectiveness usually obtained by the use of acids or bases to disperse starch to be used as flocculent for other materials.

Since both starch and phosphate-rock particles are negatively charged, it would ordinarily be assumed that starch would disperse phosphate-rock particles rather than flocculate them. There is no apparent reason for the unusual effect obtained. Flocculation of colloidal phosphate rock, however, results in an increase of about 10 per cent in total phosphate recovered in many instances.

*Example*

An example of an application of this process is as follows: A pulp in which 49 per cent of the solids was minus 10 micron in size was used. Sodium hydroxide was added as a dispersant at the rate of 4 pounds per ton of minus 10-micron solids. The plus 10-micron fraction of the solids contained 31.5 per cent $P_2O_5$, and the minus 10-micron fraction contained 19.6 per cent.

A test was first made to determine the amount of $P_2O_5$ recoverable by normal operation without addition of starch. The pulp was settled in a hydroseparator of such size as to give a theoretical separation at 10 microns. The amount of $P_2O_5$ recovered in the settled concentrate represented 62 per cent of that originally present in the pulp, which is very close to the amount that would have been obtained by sharp separation at 10 microns.

A second test was then run in which 10 pounds of starch per ton of minus 10-micron solids was added. The amount of $P_2O_5$ recovered in this test represented 86 per cent of that in the original pulp; thus about two-thirds of the phosphate in the minus 10-micron fraction was recovered by the starch addition. The $P_2O_5$ contents of the concentrates in the respective tests were 28.9 and 29.3 per cent respectively, which, when compared with the 19.6 per cent $P_2O_5$ content of the minus 10-micron solids, shows the pronounced selective flocculating effect of the starch on the phosphate.

Calculations show that the phosphate recovery obtained in these tests is equivalent to that which would be obtained by making a size separation at 1 micron instead of the 10-micron separation normally obtained in the hydroseparator. This corresponds roughly to a 10 per cent increase in over-all recovery of phosphate in the washing plant, without lowering the grade of the concentrate obtained.

From about 3 to 10 pounds of starch per ton of minus 10-micron solids are ordinarily required for effective flocculation of phosphate-rock particles.

I claim as my invention:

A process for the recovery of phosphate rock from an aqueous suspension of colloidal particles of phosphate rock, clay, and other matrix solids which comprises dispersing starch in water entirely by heat and agitation; intimately mixing the resulting starch dispersion at a concentration of about 1 per cent starch with said aqueous suspension in such quantity that about 5 to 10 pounds of starch is introduced for each ton of colloidal particles in said aqueous suspension; and separating the resulting phosphate flocs from said suspension.

JOSEPH F. HASEMAN.

References Cited in the file of this patent

UNITED STATES PATENTS

| Number | Name | Date |
|---|---|---|
| 1,029,579 | Schwerin | June 11, 1921 |
| 2,149,843 | Frick | Mar. 7, 1939 |
| 2,381,514 | Phelps | Aug. 7, 1945 |

OTHER REFERENCES

Transactions American Institute of Mining and Metallurgical Engineers, vol. 134, 139, pages 146–168.